(12) United States Patent
Niessner et al.

(10) Patent No.: US 9,644,090 B2
(45) Date of Patent: May 9, 2017

(54) POLYMER MIXTURES WITH OPTIMIZED TOUGHNESS/STIFFNESS RATIO AND OPTICAL PROPERTIES

(71) Applicant: STYROLUTION EUROPE GMBH, Frankfurt am Main (DE)

(72) Inventors: Norbert Niessner, Friedelsheim (DE); Michael Ishaque, Mannheim (DE); Philipp Böckmann, Bad Durkheim (DE); Rolf Minkwitz, Mannheim (DE)

(73) Assignee: INEOS STYROLUTION EUROPE GMBH (DE)

( * ) Notice: Subject to any disclaimer, the term of this patent is extended or adjusted under 35 U.S.C. 154(b) by 0 days.

(21) Appl. No.: 14/615,811

(22) PCT Filed: Aug. 6, 2013

(86) PCT No.: PCT/EP2013/066440
§ 371 (c)(1),
(2) Date: Feb. 6, 2015

(87) PCT Pub. No.: WO2014/023714
PCT Pub. Date: Feb. 13, 2014

(65) Prior Publication Data
US 2015/0274953 A1    Oct. 1, 2015

(30) Foreign Application Priority Data
Aug. 8, 2012  (EP) .................................. 12179673

(51) Int. Cl.
| | | |
|---|---|---|
| *C08L 25/12* | (2006.01) | |
| *C08L 51/04* | (2006.01) | |
| *C08L 25/14* | (2006.01) | |
| *C08F 220/18* | (2006.01) | |
| *C08L 33/20* | (2006.01) | |
| *C08L 51/00* | (2006.01) | |

(52) U.S. Cl.
CPC ............ *C08L 25/14* (2013.01); *C08F 220/18* (2013.01); *C08L 25/12* (2013.01); *C08L 33/20* (2013.01); *C08L 51/003* (2013.01); *C08L 51/04* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 4,224,419 A | 9/1980 | Swoboda et al. | |
| 4,788,253 A | 11/1988 | Hambrecht et al. | |
| 4,876,313 A | 10/1989 | Lorah | |
| 5,252,666 A | 10/1993 | Seitz et al. | |
| 5,631,323 A * | 5/1997 | Guntherberg | C08F 212/10 525/71 |
| 6,476,128 B1 | 11/2002 | Berzinis | |
| 2002/0028878 A1 | 3/2002 | Shin et al. | |

FOREIGN PATENT DOCUMENTS

| | | |
|---|---|---|
| CA | 2143168 A1 | 8/1995 |
| DE | 12 60 135 B | 2/1968 |
| DE | 23 11 129 A1 | 9/1974 |
| DE | 28 26 925 A1 | 1/1980 |
| DE | 31 49 358 A1 | 6/1983 |
| DE | 32 27 555 A1 | 1/1984 |
| DE | 40 06 643 A1 | 9/1991 |
| DE | 41 31 729 A1 | 3/1993 |
| EP | 0535456 A1 | 4/1993 |
| EP | 0669367 A1 | 8/1995 |
| EP | 0698637 A2 | 2/1996 |
| EP | 1893659 B1 | 10/2008 |
| GB | 1124911 A | 8/1968 |

OTHER PUBLICATIONS

Tolue, S. et al. European Polymer Journal vol. 45 pp. 714-720 (2009).*
Moghbeli, M.R. et al. Iranian Polymer Journal vol. 20 pp. 137-146 (2011).*
Kunststoff-Handbuch [Plastics handbook], Vieweg-Daumiller, vol. V (Polystyrol [Polystyrene]), Carl-Hanser-Verlag, Munich 1969, p. 124, lines 12 ff.
W. Scholtan and H. Lange, "Bestimmung der Teilchengrößenverteilung von Latices mit der Ultrazentrifuge," Kolloid-Z. and Z. Polymere 1972, 250(8), 782-796.
International Search Report for PCT Application No. PCT/EP2013/066440 dated Sep. 16, 2013.
International Preliminary Report on Patentability for PCT Application No. PCT/EP2013/066440 dated Nov. 12, 2014.
English Translation of International Preliminary Report on Patentability for PCT Application No. PCT/EP2013/066440 dated Feb. 12, 2015.
English-language Abstract of DE 32 27 555.
English-language Abstract of DE 41 31 729.
English-language Abstract of EP 0535456.
English-language Abstract of EP 0669367.

* cited by examiner

*Primary Examiner* — Irina S Zemel
*Assistant Examiner* — Jeffrey Lenihan
(74) *Attorney, Agent, or Firm* — J.A. Lindeman & Co., PLLC

(57) ABSTRACT

The invention relates to a polymer mixture made of styrene/nitrile monomer copolymers and of graft copolymers based on acrylate rubbers, and also to thermoplastic moulding compositions and mouldings produced therefrom and use of these.

11 Claims, No Drawings ns produced therefrom, and moldings, and use of
POLYMER MIXTURES WITH OPTIMIZED TOUGHNESS/STIFFNESS RATIO AND OPTICAL PROPERTIES The invention relates to a polymer mixture of styrene/nitrile-monomer copolymers and of graft copolymers based on acrylate rubbers, and also to thermoplastic molding compositions produced therefrom, and moldings, and use of these.

Impact-resistant thermoplastic compositions are often obtained by adding graft rubbers to the polymers that form the matrix, these being brittle at room temperature. The production of these impact modifiers has been known for a long time and is described by way of example in DE-A 1260135, DE-A 2311129, and DE-A 2826925. If the matrix is composed of polystyrene or of styrene copolymers, the effectiveness of the graft copolymers in respect of their impact-modifying action can be seen to increase as the size of the graft copolymers increases. Another problem with use of small-particle graft rubbers is that the toughness of the impact-modifying compositions is greatly dependent on the processing temperature.

Polymeric compositions which have improved impact resistance and retain the same good colorability can be obtained by adding a large-particle rubber component to a small-particle rubber component (bimodal rubber particles), as described in DE-A 2826925. The impact resistance, in particular the low-temperature impact resistance, achieved in those compositions is frequently inadequate for high stress levels. There are moreover restrictions on the quantity of the large-particle rubber that can be added in order to increase impact resistance; if these restrictions are ignored colorability is markedly impaired.

It is known that the properties of the soft acrylate phase can be improved if the soft polymeric phase comprises at least one crosslinking agent. U.S. Pat. No. 4,876,313 describes what are known as "core-shell" polymers obtainable via emulsion polymerization, comprising various crosslinking agents. Alkyl (meth)acrylates or styrene are preferably used as "core monomer", and methyl methacrylate and methacrylic acid are preferably used as "shell monomer". Among the preferred crosslinking agents is allyl (meth) acrylate in a quantity of from 1 to 10% by weight, based on the "core monomer". The core-shell polymers can be mixed with other multistage acrylic emulsions.

It is known that impact-resistant multiphase emulsion polymers of the ASA (acrylonitrile-styrene-acrylate) type have a particularly balanced property profile when the soft acrylate phase comprises at least one crosslinking agent.

EP-A 0535456 describes a thermoplastic molding composition with improved impact resistance comprising a styrene/acrylonitrile copolymer and a multishell graft copolymer, the core and the first graft shell of which have been crosslinked with from 0.1 to 10% by weight, preferably from 1 to 4% by weight, of a crosslinking agent, in particular dicyclopentadienyl acrylate. By way of example, graft copolymers are described in which the crosslinked core is made of polystyrene, the first crosslinked shell is made of butyl acrylate, the second shell is made of styrene, and the third shell is made of styrene and acrylonitrile.

DE-A 4006643 describes a thermoplastic molding composition made of a styrene/acrylonitrile copolymer or of an α-methylstyrene-acrylonitrile copolymer, and of a particulate graft copolymer. The graft base is a crosslinked acrylate rubber with particle size from 30 to 1000 nm. A number of polyethylenically unsaturated monomers are listed as crosslinking agents, including allyl methacrylate. Preferred crosslinking agent, and the only crosslinking agent used, is the acrylic ester of tricyclodecenyl alcohol (DCPA). The quantity of the crosslinking agent is from 0.1 to 5% by weight, preferably from 1 to 4% by weight. The graft shell is preferably made of from 45 to 80% by weight of styrene or α-methylstyrene and from 10 to 30% by weight of acrylonitrile.

The prior art cited shows that the materials can comprise various quantities of the crosslinking agents. Application of the crosslinker quantities mentioned in the prior art to ASA molding compositions with markedly different particle sizes is frequently successful only with significant losses of impact resistance. The relationship between the ideal quantities of crosslinking agents in impact-modified ASA molding compositions and the particle size thereof is not clear.

DE-A 2826925 describes a weathering-resistant, impact-resistant thermoplastic composition with good colorability, composed of a graft copolymer along with a hard component made of styrene/acrylonitrile copolymers.

The graft copolymer is composed of two graft copolymers produced separately, each of which is composed of a crosslinked acrylate graft base and of a shell made of acrylonitrile/styrene copolymers, where the particle size of the graft base of the first graft copolymer is from 50 to 150 nm and that of the second graft copolymer is from 200 to 500 nm. Preferred crosslinking agent, and the only crosslinking agent used, is the acrylic ester of tricyclodecenyl alcohol. The quantity of the crosslinking agent is from 0.5 to 10% by weight, preferably from 1 to 5% by weight.

DE-A 4131729 describes a thermoplastic molding composition with improved low-temperature toughness made of a styrene/acrylonitrile copolymer or of an α-methylstyrene-acrylonitrile copolymer and of a mixture of particulate graft copolymers A and B with particle size from 50 to 200 nm and from 200 to 1000 nm. The graft bases A1 and B1 are various crosslinked acrylate rubbers. A number of polyethylenically unsaturated monomers are listed as crosslinking agents. Preferred crosslinking agent, and the only crosslinking agent used, is the acrylic ester of tricyclodecenyl alcohol (DCPA). The quantity of the crosslinking agent is from 0.1 to 5% by weight, preferably from 0.2 to 4% by weight, for example 2% by weight. The graft shell is preferably made of from 45 to 80% by weight of styrene or α-methylstyrene and from 10 to 30% by weight of acrylonitrile.

EP-A 1 893 659 likewise describes molding compositions based on ASA resins with an elastomeric phase and a thermoplastic phase. The elastomeric phase is a rubber substrate based on an alkyl (meth)acrylate monomer and on at least one crosslinking agent. Many polyethylenically unsaturated monomers are listed as crosslinking agents. Preferred crosslinking agent, and the only crosslinking agent used, is triallyl cyanurate. A portion of the thermoplastic hard phase, which preferably comprises a styrene/acrylonitrile copolymer or a styrene/acrylonitrile/methyl methacrylate copolymer, has been grafted onto the elastomeric rubber phase. The elastomeric phase can comprise two or more rubber substrates with various particle sizes in the range from 50 to 1000 nm (measured ungrafted), in particular in the range from 80 to 500 nm. One embodiment uses an excess of the rubber substrate having relatively fine particles.

The abovementioned molding compositions have improved gloss and reduced haze, but mechanical properties, in particular at low temperatures, still require improvement. It is an object of the present invention to provide thermoplastic compositions which especially at low temperatures below 0° C., preferably irrespective of the processing temperature, have better impact resistance and stress-cracking-corrosion behavior, and in particular better multiaxial toughness values. The gloss of the molding composition should moreover be improved or at least maintained.

The object is achieved via the polymer mixtures of the invention.

The invention provides polymer mixtures made of the following polymer components A1 and A2, and/or A3, Polymer mixtures provided are therefore those made of polymer components A1 and A2, those made of polymer components A1 and A3, and also those made of polymer components A1 and A2 and A3, and in particular the following quantity ranges can be used here:

A1: from 5 to 95% by weight of a copolymer A1 of:
A11: from 60 to 80% by weight of at least one styrene or styrene derivative A11,
A12: from 40 to 20% by weight of at least one ethylenically unsaturated monomer A12 comprising a nitrile group,
A13: from 0 to 20% by weight of at least one other, copolymerizable monomer A13;
A2: from 5 to 50% by weight of a graft copolymer A2 with median particle size from 90 to 280 nm, of:
A21: from 60 to 80% by weight of at least one rubber-like graft base A21 with Tg<0° C. made of
A211: from 70 to 99.9% by weight of at least one alkyl (meth)acrylate A211,
A212: from 0.2 to 0.8% by weight of at least one allyl (meth)acrylate A212,
A213: from 0 to 2% by weight of at least one other monomer A213 having at least 2 unconjugated ethylenic double bonds,
A214: from 0 to 29.9% by weight of at least one other copolymerizable monomer A214,
A22: from 20 to 40% by weight of at least one graft shell made of:
A221: from 65 to 70% by weight of at least one vinylaromatic monomer A221,
A222: from 30 to 35% by weight of at least one polar, copolymerizable unsaturated monomer A222,
A223: from 0 to 30% by weight of at least one other, copolymerizable monomer A223; and/or
A3: from 5-50% by weight of a graft copolymer A3 with particle size from 300 to 600 nm, of:
A31: from 60 to 80% by weight of at least one rubber-like graft base A31 with Tg<0° C. made of
A311: from 70 to 99.9% by weight of at least one alkyl (meth)acrylate A311,
A312: from 0.1 to 0.5% by weight of at least one allyl (meth)acrylate A312
A313: from 0 to 2% by weight of at least one other monomer A313 having at least 2 unconjugated ethylenic double bonds,
A314: from 0 to 29.9% by weight of at least one other copolymerizable monomer A314,
A32: from 20 to 40% by weight of at least one graft shell made of:
A321: from 65 to 70% by weight of at least one vinylaromatic monomer A321,
A322: from 30 to 35% by weight of at least one polar, copolymerizable unsaturated monomer A322,
A323: from 0 to 30% by weight of at least one other, copolymerizable monomer A323.

The ratio by weight of component A2 to component A3 is often from 3:1 to 1:1. The proportions by weight of polymer components A1, A2, and/or A3 are intended to give a total of 100% by weight.

The respective ratios by weight in the polymer mixtures are often by way of example:
a) of A1 and A2 from 65:35 to 75:25, often 70:30,
b) of A1 and A3 from 65:35 to 75:25, often 70:30, and
c) of A1, A2, and A3 about 70:20:10.

The expression (meth)acrylate monomers means methacrylate monomers and acrylate monomers.

The polymer mixtures of the invention can also comprise auxiliaries and/or additives in addition to polymer components A1, A2, and/or A3. Preference is given to mixtures of the invention composed of from 50 to 99.9% by weight, preferably from 70 to 99.9% by weight, of components A1, A2, and/or A3, and from 0.1 to 50% by weight, preferably from 0.1 to 30% by weight, of the auxiliaries and/or additives.

Preference is further given to those polymer mixtures which comprise polymer components A1, A2, and A3.

Component A1

Quantities used of component A1 are from 5 to 95% by weight, preferably from 10 to 90% by weight, in particular from 30 to 80% by weight, very particularly preferably from 50 to 80% by weight.

Suitable monomers A11 are styrene and styrene derivatives such as α-methylstyrene and ring-alkylated styrenes, for example p-methylstyrene and/or tert-butylstyrene. Preference is given to styrene, α-methylstyrene, and/or p-methylstyrene, in particular styrene and/or α-methylstyrene, and very particular preference is given to use of styrene.

Monomers A12 used are preferably acrylonitrile and/or methacrylonitrile. Acrylonitrile is particularly preferred.

The proportion of the monomer A11 in the copolymer A1 is generally from 60 to 80% by weight, preferably from 60 to 65% by weight. The proportion of the monomer A12 in the copolymer A1 is generally from 40 to 20% by weight, preferably from 40 to 35% by weight.

The copolymer A1 can moreover also comprise up to 20% by weight of at least one other, copolymerizable monomer A13, for example methyl acrylate, ethyl acrylate, propyl acrylate, methyl methacrylate, ethyl methacrylate, phenylmaleimide, maleic anhydride, acrylamide, and/or vinyl methyl ether.

Preferred copolymers A1 are copolymers of styrene and acrylonitrile and/or copolymers of α-methylstyrene and acrylonitrile. It is particularly preferable that A1 is a copolymer of styrene and acrylonitrile.

A1 can be produced by well-known methods (DE-A 31 49 358, p. 9, lines 18 to 32 and DE-A 32 27 555, p. 9, lines 18 to 32), for example by well-known copolymerization of A11, A12, and optionally A13 in bulk, solution, suspension, or aqueous emulsion at conventional temperatures and pressures in known apparatuses (reference Kunststoff-Handbuch [Plastics handbook], Vieweg-Daumiller, volume V (Polystyrol [Polystyrene]), Carl-Hanser-Verlag, Munich 1969, p. 124, lines 12 ff.).

Component A2

Monomers A211 that can be used for the production of the rubber-like graft base A21 are generally alkyl (meth)acrylates having a straight-chain or branched alkyl moiety having from 1 to 12 carbon atoms, preferably from 2 to 8 carbon atoms, particularly preferably from 4 to 8 carbon atoms. Preference is given to alkyl acrylates having a straight-chain or branched alkyl moiety having from 1 to 12 carbon atoms, preferably from 2 to 8 carbon atoms, particularly preferably from 4 to 8 carbon atoms, in particular n-butyl acrylate and/or ethylhexyl acrylate. Production of the graft base A21 can use the alkyl (meth)acrylates individually or in a mixture.

The rubber-like graft base A21 also comprises from 0.2 to 0.8% by weight, preferably from 0.2 to 0.6% by weight, in particular from 0.4 to 0.5% by weight, of at least one allyl (meth)acrylate A212 as monomer component. Allyl methacrylate is preferred.

A212 acts as crosslinking agent. The expression crosslinking agents means at least bifunctional monomers having at least two reactive, unsaturated groups.

The rubber-like graft base A21 can moreover comprise up to 2% by weight, preferably up to 1% by weight, and in particular up to 0.5% by weight, of other copolymerizable monomers A213 having at least 2 ethylenic double bonds which are not conjugated in 1,3-position and which likewise function as crosslinking agent. Examples of suitable monomers A213 are divinylbenzene, diallyl maleate, diallyl fumarate, and/or diallyl phthalate, triallyl cyanurate, and preferably the acrylic ester of tricyclodecenyl acrylate (=dicyclopentadienyl acrylate (DCPA)).

It is preferable that the graft base A21 comprises no crosslinking agent A213.

Examples of possible other copolymerizable monomers A214 that can be used are the following compounds: alpha-methylstyrene, methacrylonitrile, methyl acrylate, ethyl acrylate, propyl acrylate, methyl methacrylate, ethyl methacrylate, phenylmaleimide, acrylamide, vinyl methyl ether. It is preferable that the graft base A21 comprises no monomer A214.

Monomers A221 suitable for the production of the graft shell A22 are vinylaromatic monomers such as styrene and/or styrene derivatives, for example alkylstyrene, preferably α-methylstyrene, and ring-alkylated styrenes, for example p-methylstyrene and/or tert-butylstyrene.

Preference is given to styrene and/or α-methylstyrene, particularly styrene.

Examples of polar copolymerizable unsaturated monomers A222 are acrylonitrile and/or methacrylonitrile, preferably acrylonitrile.

Examples of possible other copolymerizable monomers A223 that can be used are the following compounds: acrylic acid, methacrylic acid, maleic anhydride, methyl acrylate, ethyl acrylate, propyl acrylate, methyl methacrylate, ethyl methacrylate, phenylmaleimide, acrylamide, and vinyl methyl ether. It is preferable that A223 is methyl methacrylate and/or maleic anhydride.

It is preferable that the graft shell A22 is a copolymer of styrene and/or α-methylstyrene and acrylonitrile, preferably of styrene and acrylonitrile.

Component A3

Monomers A311, A312, A313 and A314 used for the graft base A31 are the corresponding compounds described above for the graft base A21 (A211, A212, A213, and A214).

However, the quantity used of monomer component A312, i.e. allyl (meth)acrylate, is from 0.1 to 0.5% by weight, preferably from 0.1 to 0.4% by weight, in particular from 0.1 to 0.2% by weight.

Monomers A321, A322 and A323 used for the graft shell A32 are likewise the corresponding compounds described above for the graft shell A22 (A221, A222 and A223).

In one preferred embodiment the polymer mixture of the invention made of polymer components A1 and A2 and/or A3 comprises:

A1: from 5 to 95% by weight of a copolymer A1 of
A11: from 60 to 80% by weight of styrene or α-methylstyrene A11,
A12: from 40 to 20% by weight of acrylonitrile A12,
A2: from 5 to 50% by weight of a graft copolymer A2 with median particle size from 90 to 280 nm, of
A21: from 60 to 80% by weight of a rubber-like graft base A21 with Tg<0° C. made of
A211: from 70 to 99.9% by weight of at least one alkyl acrylate having from 1 to 8 carbon atoms in the alkyl moiety A211,
A212: from 0.2 to 0.8% by weight of allyl methacrylate A212,
A22: from 20 to 40% by weight of at least one graft shell made of:
A221: from 65 to 70% by weight of styrene or α-methylstyrene A221,
A222: from 30 to 35% by weight of acrylonitrile A222, and/or
A3: from 5-50% by weight of a graft copolymer A3 with particle size from 300 to 600 nm, of
A31: from 60 to 80% by weight of at least one rubber-like graft base A31 with Tg<0° C. made of
A311: from 70 to 99.9% by weight of at least one alkyl acrylate having from 1 to 8 carbon atoms in the alkyl moiety A311,
A312: from 0.1 to 0.5% by weight of allyl methacrylate A312,
A32: from 20 to 40% by weight of at least one graft shell made of:
A321: from 65 to 70% by weight of styrene or α-methylstyrene A321,
A322: from 30 to 35% by weight of acrylonitrile A322, where the ratio by weight of component A2 to component A3 (if both are present) is from 3:1 to 1:1, and the proportions by weight of polymer components A1, A2, and/or A3 give a total of 100% by weight.

Preference is further given to polymer mixtures of the invention comprising components A1, A2, and A3 which comprise a quantity of from 0.2 to 0.6% by weight, in particular from 0.4 to 0.5% by weight, of A212 and from 0.1 to 0.4% by weight, in particular from 0.1 to 0.2% by weight, of A312.

The production of graft copolymers made of an elastomeric rubber-like graft base and of a graft shell is well known (see by way of example DE 4006643 A1, p. 2, line 65 to p. 3, line 43; DE 4131729 A1 p. 3, line 12 to p. 4, line 49).

Fine-particle graft copolymers can be produced by way of example as described in DE 4006643 A1 (p. 2, line 65 to p. 3, line 43).

Coarse-particle graft copolymers can be produced via grafting in two stages as described in DE 3227555 A1 (component B: p. 8, line 14 to p. 10, line 5) and DE-A 31 49 358 (p. 8, line 14 to p. 10, line 5).

Production of the graft copolymers A2 generally begins with production, for example by emulsion polymerization, of the rubber-like acrylate polymer A21 serving as graft base, in that by way of example alkyl acrylate A211 and the crosslinking agent A212, and optionally A213 and/or A214 are polymerized in aqueous emulsion in a manner known per se at temperatures of from 20 to 100° C., preferably from 50 to 80° C. On this resultant polyacrylate latex it is possible to graft a mixture of vinylaromatic monomers A221 with a polar copolymerizable unsaturated monomer A222 and also optionally other monomers A223, and this graft copolymerization is preferably likewise carried out in aqueous emulsion.

The production of the graft copolymers A3 proceeds, for the graft base A31, as described above for A2, but the grafting usually proceeds in two stages where the vinylaromatic monomer A321 is generally first polymerized in the presence of the graft base A31. The graft copolymerization with a mixture comprising at least one vinylaromatic monomer A321 and at least one polar copolymerizable monomer A322, and also optionally A323, can then be carried out in the second stage.

The quantities of the various components used and comprised in the polymer mixture of the invention have already been described in the introduction.

The polymerization process can moreover use the conventional auxiliaries and/or additives, for example emulsifiers, such as alkali metal salts of alkyl- or alkylarylsulfonic acids, alkyl sulfates, fatty alcohol sulfonates, salts of higher fatty acids having from 10 to 30 carbon atoms, or resin soaps, polymerization initiators, for example conventional persulfates such as potassium persulfate, or known redox systems, polymerization auxiliaries, for example conventional buffer substances that can be used for adjustment to pHs that are preferably from 6 to 9, e.g. sodium bicarbonate and/or sodium pyrophosphate, and/or molecular-weight regulators, for example mercaptans, terpinols, and/or dimeric α-methylstyrene, where the usual quantity used of the molecular-weight regulators is from 0 to 3% by weight, based on the weight of the reaction mixture.

The polymer mixture of the invention is produced by incorporating the particulate graft polymers A2 and/or A3 described above into the hard component, i.e. the copolymer A1. The method of incorporation can by way of example be that the particulate graft polymer is isolated from the emulsion by adding an electrolyte and then, optionally after drying, is mixed with the hard component by extruding, kneading, or roll-milling the materials together. The auxiliaries and/or additives below can also be added during the production of this mixture.

The material can comprise by way of example the following as auxiliaries and/or additives: plasticizers, antistatic agents, light stabilizers, lubricants, blowing agents, adhesion promoters, and optionally other compatible thermoplastics, fillers, surface-active substances, flame retardants, dyes and pigments, stabilizers with respect to oxidation, hydrolysis, light, heat, or discoloration, and/or reinforcing agents.

Light stabilizers used can be any of the conventional light stabilizers, for example compounds based on benzophenone, on benzotriazole, on cinnamic acid, on organic phosphites and phosphonites; other examples are sterically hindered amines.

Examples of lubricants are hydrocarbons such as oils, paraffins, PE waxes, PP waxes, fatty alcohols having from 6 to 20 carbon atoms, ketones, carboxylic acids such as fatty acids, montanic acid, or oxidized PE wax, carboxamides, and also carboxylic esters, e.g. with the alcohols ethanol, fatty alcohols, glycerol, ethanediol, pentaerythritol, and long-chain carboxylic acids as acid component.

Stabilizers used can be conventional antioxidants, for example phenolic antioxidants, e.g. alkylated monophenols, esters and/or amides of β-(3,5-di-tert-butyl-4-hydroxy-phenylpropionic acid, and/or benzotriazoles. Possible antioxidants are mentioned by way of example in EP-A 698637 and EP-A 669367. Specifically, mention may be made of the following as phenolic antioxidants: 2,6-di-tert-butyl-4-methylphenol, penta-erythrityl tetrakis[3-(3,5-di-tert-butyl-4-hydroxyphenyl)propionate], and N,N'-di(3,5-di-tert-butyl-4-hydroxyphenylpropionyl)hexamethylenediamine. The stabilizers mentioned can be used individually or in mixtures.

Other compatible thermoplastics can by way of example be polyesters (e.g. polyethylene terephthalate, polybutylene terephthalate), PMMA, polycarbonate, polyamide, polyoxymethylene, polystyrene, polyethylene, polypropylene, polyvinyl chloride.

These auxiliaries and/or additives can either be used before production of thermoplastic component A1 concludes or else added to component A1, A2, and/or A3 during the production of the mixture.

The invention further provides moldings produced from the polymer mixtures of the invention.

The polymer mixtures of the invention can by way of example be pelletized or granulated, or processed by well-known processes, for example by extrusion, injection molding, blow molding, or calendering to give moldings of any type, for example cable sheathing, foils, hoses, fibers, profiles, shoe shells, shoe soles, technical moldings, consumer items, coatings, bellows, and/or ear tags for animals.

A feature of the polymer mixtures of the invention, in particular at low temperatures in the range from 0 to −30° C., is an optimized toughness/stiffness ratio with retention of gloss.

The polymer mixtures of the invention can therefore be used particularly advantageously for the production of moldings that are used in the low-temperature range from 0 to −30° C. By way of example, without any restriction thereto, mention may be made in this connection of outdoor applications, e.g. in the automobile or construction sector.

The invention provides the production of the polymer mixtures via mixing of the components.

The invention therefore further provides the use, for outdoor applications, of moldings produced from the polymer mixtures of the invention.

The polymer mixtures and applications of the invention are described in more detail with reference to the examples and claims below.

EXAMPLES

The parameters described in the present application were determined as follows:

Notched impact resistance and impact resistance (kJ/m$^2$): measured in accordance with DIN 53 453 (ISO 179 1eA) on injection-molded standard small specimens at 23, 0, and −30° C., and with an injection-molding temperature of 220° C. In each case, three series of samples were tested. Tables 3-5 collate the results.

Median particle size is determined by using an ultracentrifuge and the method of W. Scholtan and H. Lange, Kolloid-Z. and Z. Polymere 250 (1972), 782-796. The ultrafuge measurement gives the cumulative mass distribution of the particles of a sample. The median particle diameter d50 is defined as follows: the diameter of 50% by weight of particles is smaller than, and the diameter of 50% by weight of the particles is greater than, the d50 value.

Puncture is determined in accordance with ISO 6603-2/40/20/c.

Gloss is measured at 60° in accordance with DIN 67530.

Modulus of elasticity is determined in accordance with ISO 527-2:1993.

MVR (220/10) is determined in accordance with ISO 1133.

Component A1:

Copolymer produced with 67% by weight of styrene as A11 and 33% by weight of acrylonitrile as A12, IV; intrinsic viscosity (measured in 0.5% toluene solution at room temperature): 80 ml/g.

Component A1 was produced by a solution polymerization process as described by way of example in: Kunststoff- Handbuch [Plastics handbook], ed. Vieweg-Daumiller, volume V (Polystyrol [Polystyrene]), Carl-Hanser-Verlag, Munich, 1969, p. 124, line 12 ff.

Component A2:

Production of the Graft Base

The respective graft base was produced in accordance with the following general specification: 160 g of the monomer mixture stated in table 1 were heated, with stirring, to 60° C. in 1500 g of water with addition of 5 g of sodium salt of a $C_{12}$- to $C_{18}$-paraffinsulfonic acid, 3 g of potassium peroxodisulfate, 3 g of sodium hydrogencarbonate, and 1.5 g of sodium pyrophosphate. 10 minutes after the start of the polymerization reaction, a further 840 g of the monomer mixture of table 1 were added within a period of 3 hours. Once monomer addition had ended, the emulsion was kept at 60° C. for a further hour.

Production of the Particulate Graft Polymers 2100 g of the emulsion produced in accordance with specification (1) were mixed with 1150 g of water and 2.7 g of potassium peroxodisulfate, and heated, with stirring, to 65° C. Once the reaction temperature had been reached, a mixture of 420 g of styrene (S) and 140 g of acrylonitrile (AN) was metered into the mixture over the course of 3 hours. Once addition was complete, the emulsion was kept at 65° C. for a further 2 hours. The graft polymer was precipitated from the emulsion by means of calcium chloride solution at 95° C., washed with water, and dried in a stream of warm air.

Various graft copolymers A2 were produced with from 0.1 to 1.0% by weight of allyl methacrylate (AMA) as crosslinking agent. The median particle size of the resultant graft copolymer A2 was from 95-105 nm. Comparative examples CE1 and CE2 were also carried out, using DCPA (as in DE 4006643 A1, p.5, table) instead of AMA.

TABLE 1

Monomer composition of graft copolymer A2

| | Graft base | | | | Graft shell (% by weight) | |
|---|---|---|---|---|---|---|
| | | DCPA (% by | | AMA (% by | | |
| | BA | weight) | DCPA (mol) | weight) | AMA (mol) | S | AN |
| CE1 | 99.0 | 1.0 | 0.176 | — | — | 75 | 25 |
| CE2 | 98.0 | 2.0 | 0.352 | — | — | 75 | 25 |
| A2-1 | 99.9 | — | — | 0.1 | 0.029 | 75 | 25 |
| A2-2 | 99.6 | — | — | 0.4 | 0.116 | 75 | 25 |
| A2-3 | 99.0 | — | — | 1.0 | 0.290 | 75 | 25 |

Values in mol are based on 9.0 kg of mixture

Component A3:

Production of the graft base A31

The quantitative data below for BA and AMA are based in each case on examples A3-1/A3-2/A3-3 as in table 2.

16.31/16.26/16.21 parts of butyl acrylate (BA) and 0.02/0.08/0.15 parts of allyl methacrylate (AMA) are heated, with stirring, to 60° C. in 150 parts of water with addition of one part of the sodium salt of a $C_{12}$-$C_{18}$-paraffinsulfonic acid, 0.3 part of potassium persulfate, 0.3 part of sodium hydrogencarbonate and 0.15 part of sodium phosphate. 10 minutes after the start of the polymerization reaction, a mixture of 83.59/83.34/83.04 parts by weight of butyl acrylate and 0.08/0.32/0.60 part of allyl methacrylate were added within a period of 3 hours. Once monomer addition had concluded, reaction of the mixture was allowed to continue for a further hour. The solids content of the resultant latex of the crosslinked butyl acrylate polymer was 40% by weight. Median particle size (weight average) was determined as 83/78/80 nm. The particle size distribution was narrow (quotient Q=0.20).

Production of a Coarse-Particle Graft Copolymer A3

The following were added to an initial charge made of 1.5 parts of the latex A31 described above: after addition of 50 parts of water and 0.1 part of potassium persulfate, over the course of 3 hours, at 60° C., firstly a mixture made of 49.95/49.80/49.625 parts of butyl acrylate and 0.05/0.20/0.375 part of allyl methacrylate, and secondly a solution of 0.5 part of the sodium salt of a $C_{12}$-$C_{18}$-paraffinsulfonic acid in 25 parts of water. Once the feed had ended, polymerization was continued for a further 2 hours. The solids content of the resultant latex of the crosslinked butyl acrylate polymer was 40% by weight. Median particle size (weight average of the latex) was determined as 473/459/460 nm.

The particle size distribution was narrow (quotient Q=0.15).

150 parts of this latex were then mixed with 20 parts of styrene and 60 parts of water, and heated, with stirring, to 65° C. for 3 hours after addition of a further 0.03 part of potassium persulfate and 0.05 part of lauroyl peroxide. The dispersion obtained in the graft copolymerization reaction was then polymerized for a further 4 hours with 20 parts of a mixture of styrene and acrylonitrile in a ratio of 75:25. The reaction product was then precipitated from the dispersion with a calcium chloride solution at 95° C., isolated, washed with water, and dried in a stream of warm air. The degree of grafting of the graft copolymer was determined as 40%; the median size of the latex particles was 564/545/551 nm.

Various graft copolymers A3 were produced with from 0.1 to 0.75% by weight of allyl methacrylate as crosslinking agent (table 2).

Comparative examples CE3 and CE4 were also carried out with DCPA (as in DE 4131729 A1, p. 6, table 1) instead of AMA.

TABLE 2

Monomer composition of graft copolymer A3

| | Graft base | | | | | Graft shell (% by weight) | |
|---|---|---|---|---|---|---|---|
| | | DCPA (% by | | AMA (% by | | | |
| | BA | weight) | DCPA (mol) | weight) | AMA (mol) | S | AN |
| CE3 | 99.0 | 1.0 | 0.176 | — | — | 75 | 25 |
| CE4 | 98.0 | 2.0 | 0.352 | — | — | 75 | 25 |
| A3-1 | 99.9 | — | — | 0.1 | 0.029 | 75 | 25 |
| A3-2 | 99.6 | — | — | 0.4 | 0.116 | 75 | 25 |
| A3-3 | 99.0 | — | — | 0.75 | 0.217 | 75 | 25 |

Values in mol are based on 9.0 kg of mixture

The mixtures A1 and A2 (table 3), A1 and A3 (table 4), and A1, A2, and A3 (table 5) of the invention were produced by mixing the respective components intimately in an extruder (ZSK 30 twin-screw extruder from Werner & Pfleiderer) at a temperature of 230° C. The respective ratios by weight were 70:30 in the case of the mixture of A1 and A2, 70:30 in the case of the mixture of A1 and A3, and 70:20:10 in the case of the mixture of A1, A2, and A3.

The mixtures for the comparative examples using DCPA as crosslinking agent component were likewise produced as described above.

The resultant mixtures were tested for various mechanical properties and for gloss. Tables 3 to 5 collate the results.

TABLE 3

Polymer mixture of A1 and A2

| | Crosslinking agent (% by weight) | Notched impact resistance | | | Impact resistance | | | Gloss |
| --- | --- | --- | --- | --- | --- | --- | --- | --- |
| | | 23° C. | 0° C. | −30° C. | 23° C. | 0° C. | −30° C. | (60°) |
| CE1 | 2.0% (0.353 mol) DCPA | 8.0 | 6.4 | 2.5 | — | 248 | 100 | 93 |
| CE2 | 1.0% (0.176 mol) DCPA | 5.9 | 5.4 | 2.5 | — | 240 | 119 | 88 |
| 1 | 0.1% (0.029 mol) AMA | 3.5 | 3.2 | 2.2 | 129 | 165 | 83 | 88 |
| 2 | 0.16% (0.046 mol) AMA | 5.4 | 5.2 | 2.5 | 179 | 191 | 103 | 91 |
| 3 | 0.25% (0.0725 mol) AMA | 10.9 | 8.6 | 4.1 | 185 | 132 | 92 | 97 |
| 4 | 0.4% (0.116 mol) AMA | 12.0 | 10.4 | 4.6 | 233 | 199 | 139 | 97 |
| 5 | 0.5% (0.145 mol) AMA | 9.3 | 7.8 | 2.7 | 252 | 141 | 83 | 97 |
| 6 | 0.75% (0.217 mol) AMA | 9.1 | 6.6 | 2.1 | 177 | 133 | 67 | 96 |
| 7 | 1.0% (0.290 mol) AMA | 6.4 | 5.0 | 1.4 | 188 | 123 | 41 | 97 |

Values in mol are based on 9.0 kg of mixture

CE1, CE2: comparative example using DCPA instead of AMA

The polymer mixtures of the invention as in table 3, made of A1 and A2, show that a considerable improvement of notched impact resistance and of impact resistance at low temperatures, in particular at −30° C., is achieved by using a graft copolymer A2 comprising allyl methacrylate (AMA) A212, even when quantities of allyl methacrylate are small, i.e. from 0.1 to 0.5% by weight, while gloss is actually increased.

Corresponding comparative examples CE1 and CE2 using DCPA as crosslinking component of the graft copolymer already show a gloss reduction when the proportion of DCPA is reduced from 2 to 1% by weight. When quantities of DCPA used are from 0.2 to 0.8% by weight the corresponding ASA product exhibits markedly matt surfaces, which are not desired.

Values in mol are based on 9.0 kg of mixture

CE3, CE4: comparative examples

The polymer mixtures of the invention as in table 4, made of A1 and A3, show that a considerable improvement of notched impact resistance and impact resistance at low temperatures, for example at −30° C., is achieved by using a coarse-particle graft copolymer A3 which comprises only small quantities of allyl methacrylate (AMA) A312 (from 0.1 to 0.5% by weight), while gloss is maintained. The mechanical properties of the polymer mixtures of the invention are actually mostly better than when markedly greater quantities of DCPA are used, while gloss is maintained.

These results were not expected and are surprising to the person skilled in the art, since it is general knowledge in the art that increasing content of crosslinking agent achieves increased or improved gloss (cf., for example, U.S. Pat. No. 6,476,128). In contrast to this, a corresponding ASA product exhibits markedly matt surfaces when DCPA is used at a concentration in the range below 1% by weight.

TABLE 4

Polymer mixture of A1 and A3

| | Crosslinking agent (% by weight) | Notched impact resistance | | | Impact resistance | | | Gloss |
| --- | --- | --- | --- | --- | --- | --- | --- | --- |
| | | 23° C. | 0° C. | −30° C. | 23° C. | 0° C. | −30° C. | (60°) |
| CE3 | 2.0% (0.353 mol) DCPA | 11.8 | 8.8 | 3.4 | 185 | 143 | 95 | 99 |
| CE4 | 1.0% (0.176 mol) DCPA | 11.8 | 8.7 | 3.4 | 198 | 147 | 120 | 98 |
| 1 | 0.1% (0.029 mol) AMA | 12.8 | 11.5 | 5.0 | 182 | 130 | 90 | 99 |
| 2 | 0.16% (0.046 mol) AMA | 12.5 | 9.9 | 5.0 | — | 171 | 124 | 99 |
| 3 | 0.2% (0.058 mol) AMA | 12.5 | 10.3 | 5.1 | — | 154 | 114 | 99 |
| 4 | 0.4% (0.116 mol) AMA | 12.1 | 9.3 | 5.0 | — | 218 | 132 | 100 |
| 5 | 0.5% (0.145 mol) AMA | 11.2 | 9.0 | 4.8 | — | 228 | 118 | 99 |
| 6 | 0.75% (0.217 mol) AMA | 9.6 | 8.4 | 4.7 | — | 178 | 126 | 99 |

TABLE 5

Polymer mixture of A1, A2 and A3

| | A2, A3 | Notched impact resistance Ak [kJ/m²] | | | Impact resistance An [kJ/m²] | | | Modulus of elasticity [MPa] | MVR (220/10) | Penetration [kJ/m²] | |
|---|---|---|---|---|---|---|---|---|---|---|---|
| | | 23° C. | 0° C. | −30° C. | 23° C. | 0° C. | −30° C. | | | 23° C. | −20° C. |
| CE1 | 2.0% by weight (0.353 mol) DCP | 8.9 | 7.4 | 2.7 | — | 144 | 93 | 2434 | 7.4 | 28.3 | 6.6 |
| 2 | 0.16% by weight (0.046 mol) AMA | 10.9 | 8.2 | 3.6 | — | 153 | 110 | 2455 | 8.0 | 39.8 | 12.8 |
| 3 | 0.4% by weight (0.115 mol) AMA | 10.5 | 6.5 | 2.0 | — | 159 | 105 | — | 8.1 | — | — |
| 4 | A2: 0.4% by weight (0.115 mol) AMA A3: 0.2% by weight (0.0575 mol) AMA | 12.2 | 7.0 | 2.1 | — | 181 | 101 | — | 8.3 | — | — |

Values in mol are based on 9.0 kg of mixture

The stated quantities of crosslinking agent were used mutually independently respectively for component A2 and A3. The comparative example was carried out correspondingly, but using 2% by weight of DCPA instead of AMA.

The polymer mixtures of the invention as in table 5, made of A1, A2, and A3, show that a considerable improvement of notched impact resistance and impact resistance at temperatures including low temperatures is achieved by using the graft copolymers A2 and A3 respectively comprising only small quantities of allyl methacrylate.

Corresponding comparative examples as in the prior art using DCPA as crosslinking component lead to markedly poorer results, although quantities of DCPA used were greater, namely respectively 2% by weight for the coarse- and fine-particle graft copolymer.

From the polymer mixtures described it is possible, by using familiar methods, to produce moldings which are in particular suitable for applications including outdoor applications and which have an improved toughness/stiffness ratio and good optical properties.

What is claimed is:

1. A polymer mixture comprising a polymeric component of A1 and A2 and/or A3:
   A1: from 5 to 95% by weight of a copolymer A1 of
   A11: from 60 to 80% by weight of at least one styrene or styrene derivative A11,
   A12: from 40 to 20% by weight of at least one ethylenically unsaturated monomer A12 comprising a nitrile group,
   A13: from 0 to 20% by weight of at least one other, copolymerizable monomer A13;
   A2: from 5 to 50% by weight of a graft copolymer A2 with median particle size from 90 to 280 nm, of:
   A21: from 60 to 80% by weight of at least one rubber-like graft base A21 with Tg<0° C. made of
   A211: from 70 to 99.8% by weight of at least one alkyl acrylate A211,
   A212: from 0.2 to 0.6% by weight of at least one allyl methacrylate A212,
   A214: from 0 to 29.9% by weight of at least one other of the following copolymerizable monomers A214 selected from methyl methacrylate, ethyl methacrylate, phenylmaleimide, acrylamide, and vinyl methyl ether,
   A22: from 20 to 40% by weight of at least one graft shell made of:
   A221: from 65 to 70% by weight of at least one vinylaromatic monomer A221,
   A222: from 30 to 35% by weight of at least one polar, copolymerizable unsaturated monomer A222;
   and/or
   A3: from 5-50% by weight of a graft copolymer A3 with particle size from 300 to 600 nm, of:
   A31: from 60 to 80% by weight of at least one rubber-like graft base A31 with Tg<0° C. made of:
   A311: from 70 to 99.9% by weight of at least one alkyl acrylate A311,
   A312: from 0.1 to 0.2% by weight of at least one allyl methacrylate A312,
   A314: from 0 to 29.9% by weight of at least one other of the following copolymerizable monomers A314 selected from methyl methacrylate, ethyl methacrylate, phenylmaleimide, acrylamide, and vinyl methyl ether,
   A32: from 20 to 40% by weight of at least one graft shell made of:
   A321: from 65 to 70% by weight of at least one vinylaromatic monomer A321,
   A322: from 30 to 35% by weight of at least one polar, copolymerizable unsaturated monomer A322,
   where the total of the proportions of polymer components A1, A2, and/or A3 is 100% by weight of the polymeric component.

2. The polymer mixture as claimed in claim 1, where the mixture further comprises auxiliaries and/or additives.

3. The polymer mixture as claimed in claim 1, characterized in that the vinylaromatic monomer A221 and A321 is styrene, α-methylstyrene or a mixture thereof.

4. The polymer mixture as claimed in claim 1, characterized in that the polar monomer A222 and A322 is acrylonitrile, methacrylonitrile or a mixture thereof.

5. The polymer mixture as claimed in claim 1, comprising:
   A1: from 5 to 95% by weight of a copolymer A1 of
   A11: from 60 to 80% by weight of styrene or α-methylstyrene A11,
   A12: from 40 to 20% by weight of acrylonitrile A12,
   A2: from 5 to 50% by weight of a graft copolymer A2 with median particle size from 90 to 280 nm, of
   A21: from 60 to 80% by weight of a rubber-like graft base A21 with Tg<0° C. made of
   A211: at most 99.8% by weight of at least one alkyl acrylate having from 1 to 8 carbon atoms in the alkyl moiety A211,
   A212: from 0.2 to 0.6% by weight of allyl methacrylate A212, A22: from 20 to 40% by weight of at least one graft shell made of:
A221: from 65 to 70% by weight of styrene or α-methylstyrene A221,
A222: from 30 to 35% by weight of acrylonitrile A222, and/or
A3: from 5-50% by weight of a graft copolymer A3 with particle size from 300 to 600 nm, of
A31: from 60 to 80% by weight of at least one rubber-like graft base A31 with Tg<0° C. made of
A311: at most 99.9% by weight of at least one alkyl acrylate having from 1 to 8 carbon atoms in the alkyl moiety A311,
A312: from 0.1 to 0.2% by weight of allyl methacrylate A312
A32: from 20 to 40% by weight of at least one graft shell made of:
A321: from 65 to 70% by weight of styrene or α-methylstyrene A321,
A322: from 30 to 35% by weight of acrylonitrile A322,
where the ratio by weight of component A2 to component A3 (if both are present) is from 3:1 to 1:1, and the total of the proportions of polymer components A1, A2, and/or A3 is 100% by weight of the polymeric component.

6. The polymer mixture of polymer components A1, A2, and A3 as claimed in claim 1, characterized in that:
from 0.4 to 0.5% by weight of allyl methacrylate A212.

7. A molding produced from a polymer mixture as claimed in claim 1.

8. A method of using moldings as claimed in claim 7 for outdoor applications comprising the step of affixing the molding to a substrate.

9. A process for the production of the polymer mixtures as claimed in claim 1, by mixing polymer components A1 and A2, and/or A3.

10. A polymer mixture comprising a polymeric component of A1, A2, and A3:
A1: from 10 to 90% by weight of a copolymer A1 of
A11: from 60 to 80% by weight of at least one styrene or styrene derivative A11,
A12: from 40 to 20% by weight of at least one ethylenically unsaturated monomer A12 comprising a nitrile group,
A13: from 0 to 20% by weight of at least one other, copolymerizable monomer A13;
A2: from 5 to 50% by weight of a graft copolymer A2 with median particle size from 90 to 280 nm, of:
A21: from 60 to 80% by weight of at least one rubber-like graft base A21 with Tg<0° C. made of
A211: from 70 to 99.8% by weight of at least one alkyl acrylate A211,
A212: from 0.2 to 0.6% by weight of at least one allyl methacrylate A212,
A214: from 0 to 29.9% by weight of at least one other of the following copolymerizable monomers A214 selected from methyl methacrylate, ethyl methacrylate, phenylmaleimide, acrylamide, and vinyl methyl ether,
A22: from 20 to 40% by weight of at least one graft shell made of:
A221: from 65 to 70% by weight of at least one vinylaromatic monomer A221,
A222: from 30 to 35% by weight of at least one polar, copolymerizable unsaturated monomer A222; and
A3: from 5-50% by weight of a graft copolymer A3 with particle size from 300 to 600 nm, of:
A31: from 60 to 80% by weight of at least one rubber-like graft base A31 with Tg<0° C. made of:
A311: from 70 to 99.9% by weight of at least one alkyl acrylate A311,
A312: from 0.1 to 0.2% by weight of at least one allyl methacrylate A312,
A314: from 0 to 29.9% by weight of at least one other of the following copolymerizable monomers A314 selected from methyl methacrylate, ethyl methacrylate, phenylmaleimide, acrylamide, and vinyl methyl ether,
A32: from 20 to 40% by weight of at least one graft shell made of:
A321: from 65 to 70% by weight of at least one vinylaromatic monomer A321,
A322: from 30 to 35% by weight of at least one polar, copolymerizable unsaturated monomer A322,
where the total of the proportions of polymer components A1, A2, and/or A3 is 100% by weight of the polymeric component.

11. A polymer mixture comprising a polymeric component of A1 and A2:
A1: from 5 to 95% by weight of a copolymer A1 of
A11: from 60 to 80% by weight of at least one styrene or styrene derivative A11,
A12: from 40 to 20% by weight of at least one ethylenically unsaturated monomer A12 comprising a nitrile group,
A13: from 0 to 20% by weight of at least one other, copolymerizable monomer A13; and
A2: from 5 to 95% by weight of a graft copolymer A2 with median particle size from 90 to 280 nm, of:
A21: from 60 to 80% by weight of at least one rubber-like graft base A21 with Tg<0° C. made of
A211: from 70 to 99.8% by weight of at least one alkyl acrylate A211,
A212: from 0.2 to 0.6% by weight of at least one allyl methacrylate A212,
A214: from 0 to 29.9% by weight of at least one other of the following copolymerizable monomers A214 selected from methyl methacrylate, ethyl methacrylate, phenylmaleimide, acrylamide, and vinyl methyl ether,
A22: from 20 to 40% by weight of at least one graft shell made of:
A221: from 65 to 70% by weight of at least one vinylaromatic monomer A221,
A222: from 30 to 35% by weight of at least one polar, copolymerizable unsaturated monomer A222;
where the total of the proportions of polymer components A1 and A2 is 100% by weight of the polymeric component.

* * * * *